United States Patent
Poor et al.

(10) Patent No.: US 6,968,022 B1
(45) Date of Patent: Nov. 22, 2005

(54) METHOD AND APPARATUS FOR SCHEDULING SWITCHED MULTIBEAM ANTENNAS IN A MULTIPLE ACCESS ENVIRONMENT

(75) Inventors: H. Vincent Poor, Princeton, NJ (US); Andrew Logothetis, Uppsala (SE)

(73) Assignee: Princeton University, Princeton, NJ (US)

( * ) Notice: Subject to any disclaimer, the term of this patent is extended or adjusted under 35 U.S.C. 154(b) by 623 days.

(21) Appl. No.: 09/667,651

(22) Filed: Sep. 22, 2000

Related U.S. Application Data

(60) Provisional application No. 60/155,736, filed on Sep. 23, 1999.

(51) Int. Cl.[7] .............................. H04L 1/00; H04B 1/69
(52) U.S. Cl. ....................... 375/346; 375/147; 375/148; 375/316
(58) Field of Search ............................... 455/3.01, 403, 455/7, 13.3, 63.4, 130, 277, 277.5, 562, 133, 134, 504; 375/347, 200, 316, 346, 147; 342/367, 374, 196, 354

(56) References Cited

U.S. PATENT DOCUMENTS

| | | | | |
|---|---|---|---|---|
| 5,844,951 A | * | 12/1998 | Proakis et al. | 375/347 |
| 5,903,826 A | * | 5/1999 | Nowak | 455/277.1 |
| 5,933,446 A | * | 8/1999 | Bond et al. | 375/130 |
| 6,141,335 A | * | 10/2000 | Kuwahara et al. | 370/342 |

OTHER PUBLICATIONS

Chang et al, "Chip–Level Beamforming vs. Symbol–Level Beamforming in Coherent CDMA Adaptive Antenna Array Systems", Jun. 1999, Communications, 1999. ICC '99. 1999 IEEE International Conference on; page(s): 1588–1592 vol. 3.*

* cited by examiner

*Primary Examiner*—Chieh M. Fan
*Assistant Examiner*—Jason M. Perilla
(74) *Attorney, Agent, or Firm*—Synnestvedt & Leehner LLP

(57) ABSTRACT

The invention is a switched beam beamforming method and apparatus for wireless communication receiving stations utilizing an array of antenna elements in which only a single beam is generated at any given instant and the beam is switched at a very high rate, e.g., faster than the data rate of the system. An algorithm for scheduling the beamforming sequence is disclosed that optimizes performance by optimizing the signal/interference-plus-noise ratio for a given set of conditions at any instant in time. In particular, spatial diversity offered by antenna arrays for direct sequence-code division multiple access communication systems is exploited by an intelligent switched beam antenna at radio frequency level. The design is optimized to yield conditional mean estimates of the communication channel during uplink transmission and compute minimum variance estimates of the communication channel by optimally combining the signals of the spatially distributed antennas at chip rate.

22 Claims, 2 Drawing Sheets

METHOD AND APPARATUS FOR SCHEDULING SWITCHED MULTIBEAM ANTENNAS IN A MULTIPLE ACCESS ENVIRONMENT

RELATED APPLICATIONS

This application is based on provisional patent application No. 60/155,736 filed Sep. 23, 1999 entitled "Scheduling of Switched Multibeam Antennas in a Multiple Access Environment", the disclosure of which is incorporated herein by reference.

FIELD OF THE INVENTION

The invention pertains to intelligent switched-beam smart antennas for radio communications systems with multiple transmitters per receiver. The invention is particularly suitable for cellular communications, but is applicable to any other type of wireless communication, such as radar, sonar, wireless local area networks, wireless local loops, and satellite communications systems.

BACKGROUND OF THE INVENTION

Beamforming techniques are well known in radio communications systems in which a single receiving station must be capable of receiving signals from multiple signal sources, i.e., transmitters (or a single source, if that source is moving) for increasing the focus or gain of the receiver in the direction of the signal(s). In particular, a plurality of receiving elements, i.e., antennas, can be focused to receive signals in a particular angular portion of the receiving area while rejecting other signals and interference outside of that angular portion of the receiving area. This can be done by using multiple, directional antennas focused on different angular portions of the geographic area of reception surrounding the antenna array. Alternately, the electrical outputs of an array of omnidirectional receiving antennas can be electronically weighted and combined in various manners so as to create a plurality of beam signals, each beam being particularly focused on a particular angular portion of the geographic region surrounding the antenna array. The output signals of the antennas, of course, are radio frequency (RF) signals. These outputs may or may not be frequency downconverted to an intermediate frequency (IF) prior to any processing. Thus, the circuitry for combining the antenna output signals operates in the RF or IF band.

Beamforming is commonly used in wireless communication systems, such as in cellular telephone system base stations, for increasing reception performance. For instance, by focusing a receiving beam on a particular transmitter, that transmitter need transmit with much less power to be adequately received by the base station relative to a system using a base station with only a single omnidirectional antenna and no beamforming.

There are three general beamforming techniques in common use at this time, namely, fixed beamforming, adaptive beamforming and switched beamforming. Fixed beamforming can be implemented with an array of multiple, directional antennas or by use of an array of multiple, omnidirectional antennas with electronic beamforming circuitry. In fixed beam systems, the beams are permanent and fixed.

In adaptive beamforming systems, the beamforming is performed electronically, rather than physically with directional antennas. Further, the antenna electrical RF output signals are combined using adaptive combining circuitry such that a receiving beam can track a moving signal source.

Finally, in switched beam systems, the RF electrical output signals of multiple, omnidirectional antennas of an antenna array are combined by RF combining circuitry to generate a plurality of fixed beam output signals, each covering an angular portion of the geographic area surrounding the array. However, in switched beam beamforming techniques, an algorithm is employed to select the one of the fixed beam output signals that provides the best reception of the signal source(s) at any given instant in the region (the region being termed a cell in cellular communications systems). As conditions change, the selected beam also changes accordingly. The switching rates typically used in switched beam beamforming systems are typically substantially slower than the data rate of the system. One common scheme is to switch about once a frame or even slower, a frame typically comprising several hundreds of data symbols.

Switched beamforming systems are commonly in use today with base stations of cellular telephone communications systems, including code division multiple access (CDMA) cellular telephone communications systems.

FIG. 1 is a block diagram of a switched beam beamforming system in accordance with the prior art. An antenna array 12 comprises multiple antennas $12_1, 12_2, \ldots, 12_N$ that are arranged at a receiving station 10, e.g., at the top of a cellular telephone system cell tower. The outputs of those antennas are fed into an analog N×B beamforming circuit 14, wherein N is the number of antennas and B is the number of beams generated by the beamforming circuitry from the antenna signals. The analog beamforming circuitry 14 weighs and combines the RF antenna output signals on lines $13_1, 13_2, \ldots, 13_N$ in accordance with a scheme dictated by beamforming control circuit 121 to produce the beam signals $15_1, 15_2, \ldots, 15_B$, each beam focused on an angular portion of the reception area. Beamforming circuit 121 may be a DSP executing a predetermined algorithm. The number of beams, B, typically is less than or equal to the number of antennas, N, in the antenna array. Each beam signal $15_1, 15_2, \ldots, 15_B$ is passed through frequency down converting circuitry $16_1, 16_2, \ldots, 16_B$ for converting the beam signals from the RF frequency range to the baseband range. Each of those signals is digitized by an analog to digital (A/D) converter $18_1, 18_2, \ldots, 18_B$. The outputs of the A/D converters are then each input to a fading multipath and multi-user channel estimation circuit, $20_1, 20_2, \ldots, 20_B$. Each of those circuits generates L output signals for each of M simultaneous transmitters at use in the given geographic area, where L is the number of paths per transmitter that the circuitry is designed to process simultaneously (e.g., typically around 3 or 4) and M is the number of simultaneous transmitters using the receive station. Those outputs are input to a minimum variance selector 22 for all of the paths and users. The minimum variance selector generates a path estimate and a path estimate error for each path of each user, i.e., L×M path estimates and L×M path estimate errors.

It should be understood by those skilled in the related arts that all circuitry subsequent to the analog-to-digital converters, i.e., circuits $20_1, 20_2, \ldots, 20_B$ and 22 typically would be digital and may be implemented by a digital signal processor (DSP), a processor, a microprocessor, an application specific integrated circuit, a finite state machine, a programmed general purpose computer or any other equivalent (hereinafter collectively "DSP"). In fact, because of the large amount of processing needed to generate the path estimates and path estimate errors from the beams, the flat fading multipath and multiuser estimation and the minimum variance selection typically is performed by a bank of DSPs.

In the analog N×B beamforming circuitry 14, for each beam, dedicated RF combining circuitry is necessary, i.e., there are B copies of essentially identical circuitry for processing the N beams on lines $15_1, 15_2, \ldots, 15_B$. RF band hardware is much more expensive than DSPs and other baseband circuitry. Also, as shown in FIG. 1, each beam requires a dedicated frequency down converting circuit 16 and a dedicated analog-to-digital converter 18.

Accordingly, it is an object of the present invention to provide an improved switched beam beamforming method and apparatus.

It is another object of the present invention to provide a switched beam beamforming apparatus which reduces the amount of RF or IF band circuitry needed.

It is a further object of the present invention to provide a lower cost switched beam beamforming method and apparatus.

It is yet another object of the present invention to provide a switched beamforming method and apparatus in which the bulk of the signal processing requirements are transferred from the RF or IF band to the baseband.

It is yet a further object of the present invention to provide a switched beam beamforming method and apparatus having equivalent or superior performance to prior art techniques utilizing much lower cost circuitry components.

SUMMARY OF THE INVENTION

The invention is a switched beam beamforming method and apparatus for wireless communication receiving stations utilizing an array of antenna elements in which only a single beam is formed at any given instant and the beam is switched at a very high rate, e.g., the chip rate of a direct sequence-code division multiple access-communication system. An algorithm for scheduling the beamforming sequence is disclosed that optimizes performance by optimizing the signal/interference-plus-noise ratio for a given set of conditions at any instant in time. Those conditions include, for instance, the number and location of the various transmitters and the environmental conditions that dictate the various paths of the transmit signals in the reception area (e.g., cell). In particular, spatial diversity offered by antenna arrays for direct sequence-code division multiple access communication systems is exploited by an intelligent switched beam antenna at radio frequency level. The design is optimized to yield conditional mean estimates of the communication channel during uplink transmission and compute minimum variance estimates of the communication channel by optimally combining the signals of the spatially distributed antennas at chip rate.

DETAILED DESCRIPTION OF THE INVENTION

1. Introduction

Figure 1:
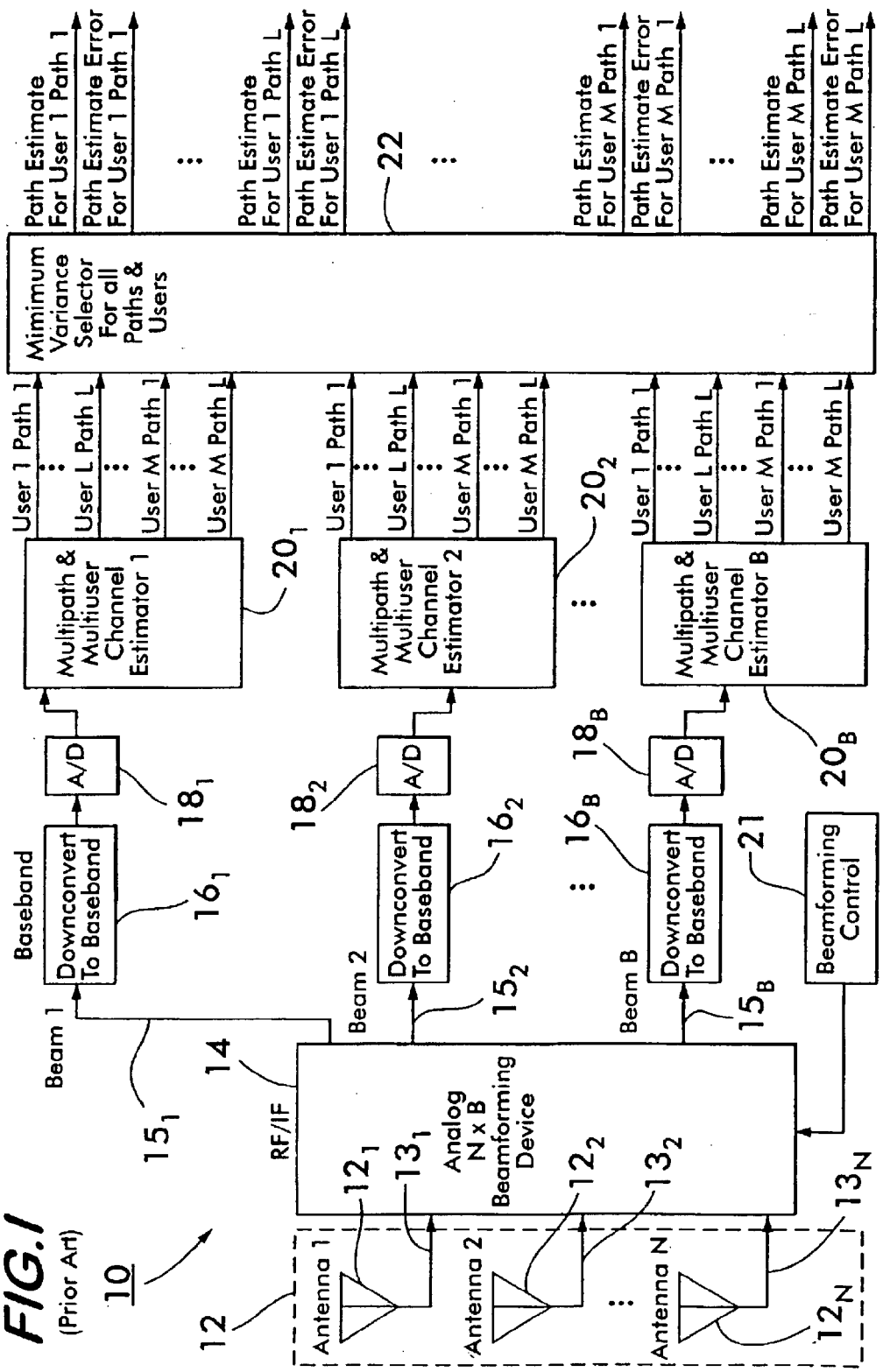
FIG. 1 is a block diagram of an exemplary switched beam forming device of the prior art.

One of the primary objects of the present invention is to provide a receiving circuit in which the received RF signals are immediately down converted to the base band and sampled after the antenna and the beamforming is performed in the baseband.

In this specification, we design a new switched beam antenna array receiver that is particularly suited to direct sequence-code division multiple access (DS-CDMA) communication systems operating in multipath Rayleigh flat-fading channels. However, the invention is not limited to DS-CDMA and can be more broadly applied to other spread spectrum and multiple access communication systems, including, but not limited to, other CDMA communication methods and TDMA communication methods. Also, the invention is not limited to Rayleigh flat-fading channels, but can be used in other channels, such as frequency selective channels.

In accordance with the invention, the beamforming technique selects the best beam from a set of fixed beams at a high frequency, such as chip rate, and generates a beam signal only for that selected beam at any given instant. Chip rate is the transition rate of the spreading sequence of the DS-CDMA scheme and is many times faster than the data rate of the data signal which is modulated with the spreading sequence in order to create the spread spectrum transmit signals. In this manner, when there are multiple simultaneous users (i.e., transmitters within the cell), multiple beams can be selected during a single data symbol interval, thus providing maximized performance, e.g., the highest signal/noise-plus-interference ratio. A Kalman filter is used to estimate the attenuated spread spectrum signals for all users and all transmission paths.

The theory, algorithms and operations that allow us to form only one beam at each instant in time with beam switching at a high rate, such as chip rate, will now be described in detail. The remainder of this specification is organized as set forth below. In section II, we describe the communication system, give the model assumptions and introduce our DS-CDMA switched-beam communication system as a linear, Gaussian, time-varying state-space model. In section II.1, we formulate the estimation objective, by seeking an optimal chip-rate beamforming scheduling (switching) sequence that yields minimum variance estimates of the received spread spectrum signals. Section II.2 presents some well known beamforming techniques. In section III, we present a method for computing the optimal scheduling for switched beam antenna arrays. Finally, we summarize our work in section IV.

II. Model Assumptions and Problem Formulation

Consider an asynchronous DS-CDMA system with M transmitting users. The continuous-time baseband complex transmitted signal $S_m(t)$ of the mth user is given by $$S_m(t) = \sqrt{2P_m} b_m(t) c_m(t) e^{j\phi_m} \quad (1)$$

where $P_m$, $b_m(t)$, $c_m(t)$ and $\phi_m$ denote the transmitted power, data symbol, the spreading signal, and phase of the mth user. The spreading signal $c_m(t)$ is given by $$c_m(t) = \sum_{k=-\infty}^{\infty} c_{k,m} \text{rect}_{T_c}(t - kT_c) \quad (2)$$

where $\text{rect}_{T_c}(t)$ is a unit rectangular pulse of duration $T_c$, and $c_{k,m} \in \{-1,1\}$ denotes the kth chip of the mth user. The spreading code sequences $\{c_{k,m}\}$ for all users are known to the receiver.

Let $T_b$ denote the symbol (or bit) duration. The ratio $G = T_b/T_c$ is known as the processing gain. In this specification, we assume G to be an integer for convenience. The data signal $b_m(t)$ is given by $$b_m(t) = \sum_{k=-\infty}^{\infty} b_{n,m} rect_{T_b}(t-nT_b) = \sum_{k=-\infty}^{\infty} b_{k,m}^c rect_{T_c}(t-nT_c) \quad (3)$$

where $b_{n,m} \in \{-1,1\}$ is the nth data bit of the mth user. Let $b_{n,m} = b_{0+nG,m}^c = b_{1+nG,m}^c = \ldots b_{G-1+nG,m}^c$ for $n \in \{-\infty, \ldots, \infty\}$, $m \in \{1, \ldots, M\}$. Thus, we have subdivided the symbol $b_{n,m}$ into G consecutive and equal symbols $\{b_{0+nG,M}^c, b_{1+G,m}^c, \ldots, b_{G-1+nG,m}^c\}$. The period of each $b_{k,m}^c$ is equal to the chip period $T_c$. In this specification, the data signals are treated as deterministic, but unknown, functions of time.

Due to reflections from large objects, diffractions and scattering, multiple, delayed and attenuated copies of the same transmitted signals are induced on the different elements of the array. Here, in a preferred embodiment, we assume an N element uniform linear array. In an exemplary embodiment, the antenna elements are equally spaced along the x axis and the distance between two adjacent elements is $d=\lambda/2$, where $\lambda$ denotes the wavelength of the carrier.

The N vector channel impulse response from the mth user to the antenna array is given by $$h_m(t,\tau) = \sum_{l=1}^{L_m(t)} \alpha(\phi_{m,l}) \rho_{m,l,l}(t) e^{j\psi_{m,l}(t)} \delta(t-\tau_{m,l}(t)) \quad (4)$$

where $L_m(t)$ is the known—possibly time varying—number of resolvable paths. $\delta(t)$ is the Dirac delta function. $\phi_{M,l}$ is the known direction of arrival (DOA) or angle of arrival (AOA) of the mth user's signal via the lth path. The AOA is measured anti-clockwise from positive real axis. $\rho_{m,l}(t)$, $\psi_{m,l}(t)$ and $T_{k,l}(t)$ are the signal attenuation, phase shift and time delay of the lth multipath component for user m, respectively, $\alpha(\phi)$ is known as the steering vector, and denotes the response of the antenna array to a signal impinging onto the array from an angle $\phi$. For a uniform linear array, the steering vector is given by $$\alpha(\phi) = [g_1(\phi)\alpha_1(\phi), g_2(\phi)\alpha_2(\phi), \ldots, g_N(\phi)\alpha_N(\phi)] \quad (5)$$

where $g_n(\phi)$ denotes the directivity (gain) of the nth antenna element impinging on the array from angle $\phi$. Here we assume for illustrative purposes that all the elements have unit directivity, i.e., $g_1(\phi) = \ldots = g_N(\phi) = 1$. For our uniform linear array, we have $$\alpha_n(\phi) = e^{j\pi(n-1)\cos(\phi)}, \forall n \in \{1, \ldots, N\} \quad (6)$$

The receiving signal at the array elements is given by the superposition of all of the channel distorted users' signals, that is $$r(t) = \sum_{m=1}^{M} S_m(t) * h_m(t,\tau) \quad (7)$$

$$= \sum_{m=1}^{M} \sum_{l=1}^{L_m(t)} \alpha(\phi_{m,l}) \alpha_{m,l}(t) b_m(t-\tau_{m,l}(t)) c_m(t-\tau_{m,l}(t))$$

where * denotes the convolution operator, and the complex amplitude $\alpha_{m,l}(t)$ $$\alpha_{m,l}(t) = \sqrt{2P_m} \rho_{m,1}(t) e^{j(\psi_{m,l}(t)+\phi_m)} \quad (8)$$

denotes the attenuated, phase shifted multiplicative channel interference at time t via the lth path for the mth user.

Prior to sampling, the signals from each element of the antenna array are multiplied with a complex number and then summed to form the array output. The process of combining the to signals at the array is known as beamforming. The output of the beamforming array is given by $$y(t) = f^H(t)r(t) + f^H(t)w(t) \quad (9)$$

where w(t) is the vector representing the additive background noise, $(\cdot)^H$ denotes the complex transpose operator, and f(t) denotes the time-varying beamforming vector.

A discrete time version of Eq. (9) is given by sampling the output of the beamformer at fixed intervals. In this exemplary embodiment, the sampling rate is set to the chip rate. The scalar complex discrete-time beamformer output is thus given by $$y(kT_c+\Delta) = f^H(kT_c+\Delta)r(kT_c+\Delta) + f^H(kT_c+\Delta)w(kT_c+\Delta) \quad (10)$$

for $k = \ldots, -2, -1, 0, 1, 2, \ldots$. The sampling offset is denoted by $\Delta$, such that $0 \leq \Delta < T_c$.

Model and Statistical Assumptions:

We now present some important assumptions for our analysis. Those of skill in the art will recognize that other assumptions are possible while remaining within the scope of the present invention.

Flat fading: We model the communication channel as flat-fading. The delay spread, which is defined as the inverse of the channel coherence bandwidth, is assumed much smaller than the symbol period. Here, we further assume that, $0 \leq \tau_{m,l}(t) < T_c$, for all times t, users m, and propagation paths l. Let the maximum number of paths $L_m(t)$ for each user to be equal to L.

Sampling: We chose our sampling instances, such that the sampling offset $\Delta$ satisfies the following condition $$0 \leq \tau_{m,l}(t) < \Delta < T_c, \forall t, m \in \{1, \ldots, M\}, l \in \{1, \ldots, L\} \quad (11)$$

As a consequence of Eq. (11), the users appear synchronous at the receiver.

Independent Rayleigh distributed multiplicative channel coefficients: We assume the channel coefficients $\alpha_{m,l}(t)$ in Eq. (8) between symbol intervals are modeled as independent zero-mean circular white Gaussian noise processes and remain constant during each symbol period. In particular, for $n,n' = -\infty, \ldots, \infty, m,m' \in \{1, \ldots, M\}$ and $l,l' \in \{1, \ldots, L\}$, $$\alpha_{m,1}(nT_b+\Delta) \sim N\{0, \sigma_{m,l}^2\} \quad (12)$$

$$\alpha_{m,l}(nT_b+\Delta) = \alpha_{m,l}(nT_b+T_c+\Delta) = \ldots = \alpha_{m,l}(nT_b+(G-1)T_c+\Delta) \quad (13)$$

$$V_{k,m,l} = \begin{cases} \chi_{k,m,l} & \forall k \in \{\ldots, -2(G-1), -G-1), 0, G-1, 2(G-1), \ldots\} \\ 0, & \text{otherwise} \end{cases}$$

$$E\{\alpha_{m,l}(nT_b+\Delta)\alpha_{m',l'}(n'T_b+\Delta)\} = \delta_{n,n'}\delta_{m,m'}\delta_{l,l'}\sigma_{m,l}^2 \quad (14)$$

where $\delta_{k,k'}$ denotes the Kronecker delta function, that is $\delta_{k,k'}=1$, if k=k', and $\delta_{k,k'}=0$ otherwise.

Temporally white observation noise: The noise vector $w(kT_c+\Delta)$ is modeled as a zero-mean circular white Gaussian noise process with a known N×N covariance matrix R. For $k = -\infty, \ldots, \infty$, we have $$E\{w(kT_c+\Delta)\} = 0_{N \times 1}$$

$$E\{w(kT_c+\Delta)w^H(kT_c+\Delta)\} = R\delta_{k,k'} \quad (15)$$

where $0_{N \times 1}$ denotes a N×1 vector of zeros.

Discrete-time state-space model: For notational convenience, we rewrite the kth sampled array output after beamforming, given by Eq. (10), as follows $$Y_k = f_k^H \tau_k + f_k^H W_k \quad (16)$$

where $y_k \triangleq y(kT_c+\Delta)$, $f_k \triangleq f(kT_c+\Delta)$ and $w_k \triangleq w(kT_c+\Delta)$. Here we use the subscript k to denote the kth sample.

Let $\chi_{k,m,l}$ denote the attenuated received spectrum signal at time k for the mth user via the lth path, i.e.

$$X_{k,m,l} \triangleq b_{k,m}{}^c c_{k,m} \alpha_{k,m,l} \quad (17)$$

where $\alpha_{k,m,l} \triangleq \alpha_{m,k}(kT_c+\Delta)$. Let $$V_{k,m,l} = \quad (18)$$
$$\begin{cases} \chi_{k,m,l} & \forall k \in \{ \ldots, -2(G-1), -(G-1), 0, G-1, 2(G-1), \ldots \} \\ 0, & \text{otherwise} \end{cases}$$

denote the realization of the attenuated and phase shifted spread spectrum $\chi_{k,m,l}$ every G samples. Since the product $b_{k,m}{}^c c_{k,m}$ yields ±1, and from our statistical assumptions on the channel fading, $V_{k,m,l}$ is complex white Gaussian distributed random variable, such that $$V_{k,m,l} \sim N(0, \tau_{m,l}^2), \text{ for } k \in \{ \ldots, -2(G-1), -(G-1), 0, G-1, 2(G-1), \ldots \} \quad (19)$$

and $V_{k,m,l}=0$, otherwise. Let $$h_k = \quad (20)$$
$$\begin{cases} 0, & \forall k \in \{ \ldots, -2(G-1), -(G-1), 0, G-1, 2(G-1), \ldots \} \\ 1, & \text{otherwise} \end{cases}$$

The attenuated phase shifted received spread spectrum signal $\chi_{k,m,l}$ can be written in the following scalar recursive form $$\chi_{k,m,l} = h_k c_{k,m} c_{k-1,m,l} \chi_{k-1,m,l} + V_{k,m,l} \quad (21)$$

We group the received signals $\chi_{k,m,l}$ at time index k in a ML×1 vector $\chi_k$ as follows $$\chi_k^H \triangleq (\chi_{k,1,1}, \ldots, \chi_{k,1,L}, \ldots, \chi_{k,M,1}, \ldots, \chi_{k,M,L})^H \quad (22)$$

if we define $V_k^H \triangleq (V_{k,1,1}, \ldots, V_{k,1,L}, \ldots, V_{k,M,1}, \ldots, V_{k,M,L})^H$, then we have the following vector state equation for the time evolution of the received spread spectrum signals for all user and all paths $$\chi_k^H \triangleq A_k \chi_{k-1} + V_k \quad (23)$$

where $$V_k \sim N(0_{ML \times 1}, Q), \forall k \in \{ \ldots, -2(G-1), -(G-1), 0, G-1, 2(G-1), \ldots \} \quad (24)$$

$$V_k + 0, \text{ otherwise} \quad (25)$$

and $$A_k = \text{diag}\Big( \underbrace{h_k c_{k-1,1} c_{k,1}, \ldots, h_k c_{k-1,1} c_{k,1}}_{L \text{ Times}}, \ldots, \quad (26)$$
$$\underbrace{h_k c_{k-1,M} c_{k,M}, \ldots, h_k c_{k-1,M} c_{k,M}}_{L \text{ Times}} \Big)$$

$$Q = \text{diag}(\sigma_{1,1}^2, \ldots, \sigma_{1,L}^2, \ldots, \sigma_{M,1}^2, \ldots, \sigma_{M,L}^2) \quad (27)$$

where $A_k$ and Q are ML×ML diagonal matrices.

Let $\phi$ denote the vector of all angle of arrivals for all M users.

$$\phi^H = (\phi_{1,1}, \ldots, \phi_{1,L}, \ldots, \phi_{M,1}, \ldots, \phi_{M,L})^H \quad (28)$$

We use $A(\phi)$ to denote the N×ML matrix response of the array, defined as follows $$A(\phi) = (a(\phi_{1,1}), \ldots, a(\phi_{1,L}), \ldots, a(\phi_{M,1}), \ldots, a(\phi_{M,L}))^H \quad (29)$$

The ((m−1)×L=1) th column vector in $A(\phi)$ corresponds to the antenna array vector response of a signal impinging onto the antenna array from angle $\phi_{m,l}$.

Using Eqs. (23) and (29), the observation Eq. (16) is equivalently written as $$y_k = f_k^H A(\phi) \chi_k + f_k^H W_k \quad (30)$$

Equations (23) and (30) form the discrete-time, state-space version of the DS-CDMA beamforming linear antenna array system.

1. Optimal Chip-Rate Switched-Beam Design

In this subsection, we formulate the estimation objectives. The aim is to design the time varying switched-beam beamforming vector $f_k$, such that the minimum estimation error in estimating the received spread spectrum signal $\chi_k$ defined in Eq. (22) is obtained. We choose the beamforming vector $f_k$ to be a function of the data from time index 0 up to time index k−1, Furthermore, $f_k$ belongs to a set of fixed beam array patterns F. Thus, $$f_k = f_k(Y_0, Y_1, \ldots, Y_{k-1}) \in F \quad (31)$$

for k=1,2,.... The aim is to select the class of beam patterns F and optimally select the sequence of beam-patterns from the set F, such that the estimation errors in estimating the spread spectrum signals are minimized. We chose the following optimization function $$h_k = E\{(\chi_k - \chi_{k/k})^H J (\chi_k - \chi_{k/k})\} \quad (32)$$

where $\chi_{k/k} \triangleq \{\chi_k / Y_k\}$ is the conditional mean estimate of $\chi_k$, conditioned on the data $Y_k \triangleq (y_0, Y1, \ldots, Yk)$, and J is some predetermined—user defined—weighting matrix. We choose the sequence of optimal beamforming vector $(\hat{f}_0, \hat{f}_1, \hat{f}_2, \ldots, \hat{f}_k)$, as follows $$(\hat{f}_0, \hat{f}_1, \ldots \hat{f}_k) = \underset{f_0, f_1, \ldots, f_k}{\text{argmax}} E\{(\chi_k - \chi_{k/k})^H J (\chi_k - \chi_{k/k})\} \quad (33)$$

subject to Eq. (31).

In the following subsection, we present several well known beamforming techniques.

2. Beamforming Techniques

We group our beamforming techniques according to Fixed-beam system, where the antenna beams are fixed in azimuth.

Maximizing the response of the antenna array in the direction of a mobile unit.

Minimizing the average output power of the beamforming array, while ensuring unity response in a desired direction.

We now present details on selecting the sets of beamforming array patterns based on the three beamforming techniques mentioned above.

Fixed Beam System: The beamforming vectors in a fixed-beam antenna array system are designed to jointly span the entire area around the cell site. Let B denote the number of fixed beams and $\phi_1$ denote the ith angle of the beam where the antenna array is pointing. The set of fixed beams are given by $$F_1 = \{\alpha(\phi_1), \alpha(\phi_2), \ldots, \alpha(\phi_B)\} \tag{34}$$

Conventional Beamformer: The beamforming vectors in a conventional beamformer are proportional to the steering vector in the known direction of the desired signal. The complex beamforming vector weights have equal magnitudes and the phases are set to the phases of the array vector response when the angle of arrival is in the desired direction $\theta$.

From the previous discussion, we assume M×L steering vectors associated with M×L known angle-of-arrivals $\phi_{m,l}$. The set of conventional beamforming array vectors is given by $$F_2 = \{\alpha(\phi_{1,1}), \ldots, \alpha(\phi_{1,L}), \ldots, \alpha(\phi_{M,1}), \ldots, \alpha(\phi_{M,L})\} \tag{35}$$

Optimal Beamforming: The optimal beamforming vector is derived by minimizing the average output power of the beamforming array, while ensuring the unity response in the desired direction $s_0$. Assuming $f=f_k$ for all k, we solve the following optimization problem $$\min_f E\{yy^H\}, \text{ subject to } f^H s_0 = 1 \tag{36}$$

Using Lagrange's multiplier method, the optimal beamformer f can be expressed as follows $$f = \frac{D^{-1} s_0}{s_0^H D^{-1} s_0} \tag{37}$$

where D denotes the average signal, multi-user interference (MUI) plus noise covariance.

From our statistical assumptions on our signal model, we can show the following result $$D = A(\phi) Q A^H(\phi) + R \tag{38}$$

Note that D is a positive definite matrix since Q and R are positive definite matrices. Thus, the set of optimal beamforming steering vectors are given by $$F_3 = \left\{ \frac{D^{-1}\alpha(\phi_{1,1})}{\alpha^H(\phi_{1,1})D^{-1}\alpha(\phi_{1,1})}, \ldots, \frac{D^{-1}\alpha(\phi_{1,L})}{\alpha^H(\phi_{1,L})D^{-1}\alpha(\phi_{1,L})}, \ldots, \frac{D^{-1}\alpha(\phi_{M,1})}{\alpha^H(\phi_{M,1})D^{-1}\alpha(\phi_{M,1})}, \ldots, \frac{D^{-1}\alpha(\phi_{M,L})}{\alpha^H(\phi_{M,L})D^{-1}\alpha(\phi_{M,L})} \right\}$$

III. Optimal Switched-Beam Design

We now summarize our state-space model, estimation objectives and present the optimal switched-beam sequence $f_k$ in the following theorem:

Theorem 3.1 Given

System model: The multipath Rayleigh fading DS-CDMA spread spectrum communication system sampled at chip rate at the antenna array output after beamforming is described by the following discrete time equation $$\chi_{k+1} = A_{k+1}\chi_k + V_{k+1} \tag{40}$$

$$y_k = f_k^H A(\phi)\chi_k + f_k^H w_k, \text{ for } f_k \in F \tag{41}$$

where k is the time index, and $\chi_k$ is the state vector representing the received attenuated and phase shifted versions of the DS-CDMA signals. The state transition matrix $A_k$ is given by Eq. (26) and the process noise $v_k$ is a zero-mean complex white Gaussian noise sequence give by Eqs. (24) and (25). $f_k$ is the beamforming vector and it is an element of a finite set F of preselected steering vectors. $w_k$ is the noise vector at the antenna array, and $w_k$ is modeled as a zero-mean complex white Gaussian measurement noise sequence with positive definite covariance R. Finally, we assume that the process noise $v_k$ and observation noise $w_k$ are statistically uncorrelated, that is $E\{w_k v_l^H\}=0$ for $k,l=0, 1, 2, \ldots$.

Known Model parameters: The angle-of-arrivals $\phi$ for all spread spectrum users and their associated steering vectors are known, thus $A(\phi)$ is assumed known. The spreading sequences also are known to the receiving antenna array, thus $A_k$ are known for all k. Finally, the noise covariance matrices Q and R are also known. When some of the model parameters are not known, then the unknown parameters can be estimated. Model parameter estimation is not investigated here. Standard techniques may be used for this purpose.

Constraints: We chose F to be equal to one of the three beamforming vector sets discussed in Section II.2. Only one beamforming vector $f_k \in F$ may be used at any one time. The active beamforming vector at time k is selected via one of the following control laws.

$$\bar{f}_k = \bar{f}(k, A(\phi), A_k, Q, R) \in F \tag{42}$$

$$f_k = f(k, A(\phi), A_k, Q, R, Y_{k-1}) \in F \tag{43}$$

The closed-loop control function $f(k,A(\phi),A_k,Q,R,Y_{k-1})$—to be determined—at time k makes use of all available information up to time k. $Y_k$ denotes the measurement sequence $(y_0, y_1, \ldots, y_k)$ Note that $f_k$ is a function of the data $Y_{k-1}$ and thus the measurement $y_k$ is also a function of $Y_{k-1}$. The open-loop control function $\bar{f}(k,A(\phi),A_k,Q,R)$ at time k is a function of the known model parameters and a function of time.

Objective Functions: Compute the chip-rate beamforming vector sequences $$\hat{F}_{G-1} \triangleq (\hat{f}_o, \hat{f}_1, \ldots, \hat{f}_{G-1}) \text{ and } \bar{\hat{F}}_{G-1} \triangleq (\bar{\hat{f}}_o, \bar{\hat{f}}_2, \ldots, \bar{\hat{f}}_{G-1})$$

which respectively maximize the terminal cost function $h_{G-1} = E\{(X_{G-1} - X_{G-1}|_{G-1})^H J(X_{G-1} - X_{G-1}|_{G-1})\}$ as follows $$\hat{F}_{G-1} = \underset{F_{G-1}}{\mathrm{argmax}} E\{(\chi_{G-1} - \chi_{G-1|G-1})^H J(\chi_{G-1} - \chi_{G-1|G-1})\} \quad (44)$$

$$\hat{F}_{G-1} = \underset{F_{G-1}}{\mathrm{argmax}} E\{(\chi_{G-1} - \chi_{G-1|G-1})^H J(\chi_{G-1} - \chi_{G-1|G-1})\} \quad (45)$$

Then the optimal control sequences $$(\hat{f}_0, \ldots, \hat{f}_{G-1}) \text{ and } (\hat{\tilde{f}}_0, \ldots, \hat{\tilde{f}}_{G-1})$$

obtained from (44) and (45), respectively, are computed off-line by solving a nonlinear deterministic optimization problem. In particular 1. $\hat{f}_k = \hat{\tilde{f}}_k$, for $k = 0, 1, \ldots, G-1$ 2. $\hat{F}_{G-1} = \underset{F_{G-1}}{\mathrm{argmax}} Tr\{JP_{G-1|G-1}(F_{G-1})\}$ where $P_{G-1}|_{G-1}(F_{G-1})$
$\Delta E\{(\chi_{G-1} - \chi_{G-1}|\chi_{G-1})\chi_{G-1} - \chi_{G-1} - G_{-1})^H|Y_{G-1}, F_{G-1})\}$
denotes the error covariance matrix of $\chi_{G-1}$ given the data $Y_{G-1}, P_{G-1}|_{G-1}(F_{G-1})$ is the solution of the discrete-time Riccati equation, computed by running a Kalman filter, as follows $$P_{k|k-1}(F_{k-1}) = A_k P_{k-1|k-1}(F_{k-1}) A_k^H + Q \quad (46)$$

$$S_{k|k-1}(F_k) = f_k^H A(\phi) P_{k|k-1}(F_{k-1}) A^H(\phi) f_k + f_k R t_k^H \quad (47)$$

$$P_{k|k}(E_k) = P_{k|k-1}(F_{k-1})[I - f_k A^H(\phi) S_{k|k-1}^H(F_k) f_k^H A(\phi) P_{k|k-1}(F_{k-1})]$$

for $k=0, \ldots, G-1$ and $P_{-1|-1}(F_{-1}) = 0_{ML \times ML}$

Proof: The proof follows similarly to the proof in L. Meier, J. Peschon and R. M. Dressier, *Optimal Control of Measurement Subsystems*, IEEE Transactions on Automatic Control, Vol. 12, No. 5, pp. 528–536, October 1967, where dynamic programming is used to compute the optimal control for controlling the measurement equations in a Linear Quadratic Control (LQC) problem.

Thus, the error covariance matrix $P_{G-1|G-1}(F_{G-1})$, as shown from the Riccati equations above, is data independent. Furthermore, the open-loop and closed-loop beamforming vector sequences are identical. The optimal sequence is derived by using one of: 1) dynamic programming, 2)enumeration or 3)enumeration via optimal pruning.

Dynamic programming is not suitable for this particular application since the dynamic programming solution requires the quantization of a large dimensional error covariance matrix. The optimal beamforming sequence via enumeration is computed by considering all possible beamforming vector sequences and choosing the sequence that yields the minimum terminal cost. In A. Logothetis and A. Issakson, *On Sensor Scheduling via Information Theoretic Criteria, American Control Conference*, 1999, an algorithm that reduces the complexity in searching the optimal sequence is derived. The algorithm in that paper is an enumeration scheme with optimal pruning where sets of sequences are deleted without the possibility of removing the optimal sequence.

IV. Exemplary Device

As can be seen from the discussion above, the beam scheduling sequence does not require any of the observations to be determined. Further, it does not need to be revised at a very high frequency since the environmental conditions that require revision of the beam scheduling sequence occur at a very slow rate compared to the processing speed of modern communications electronics. Accordingly, in one exemplary embodiment, the beamforming sequence can be computed offline and stored in a look-up table with the look up table being updated at regular intervals, such as once every frame.

Figure 2:
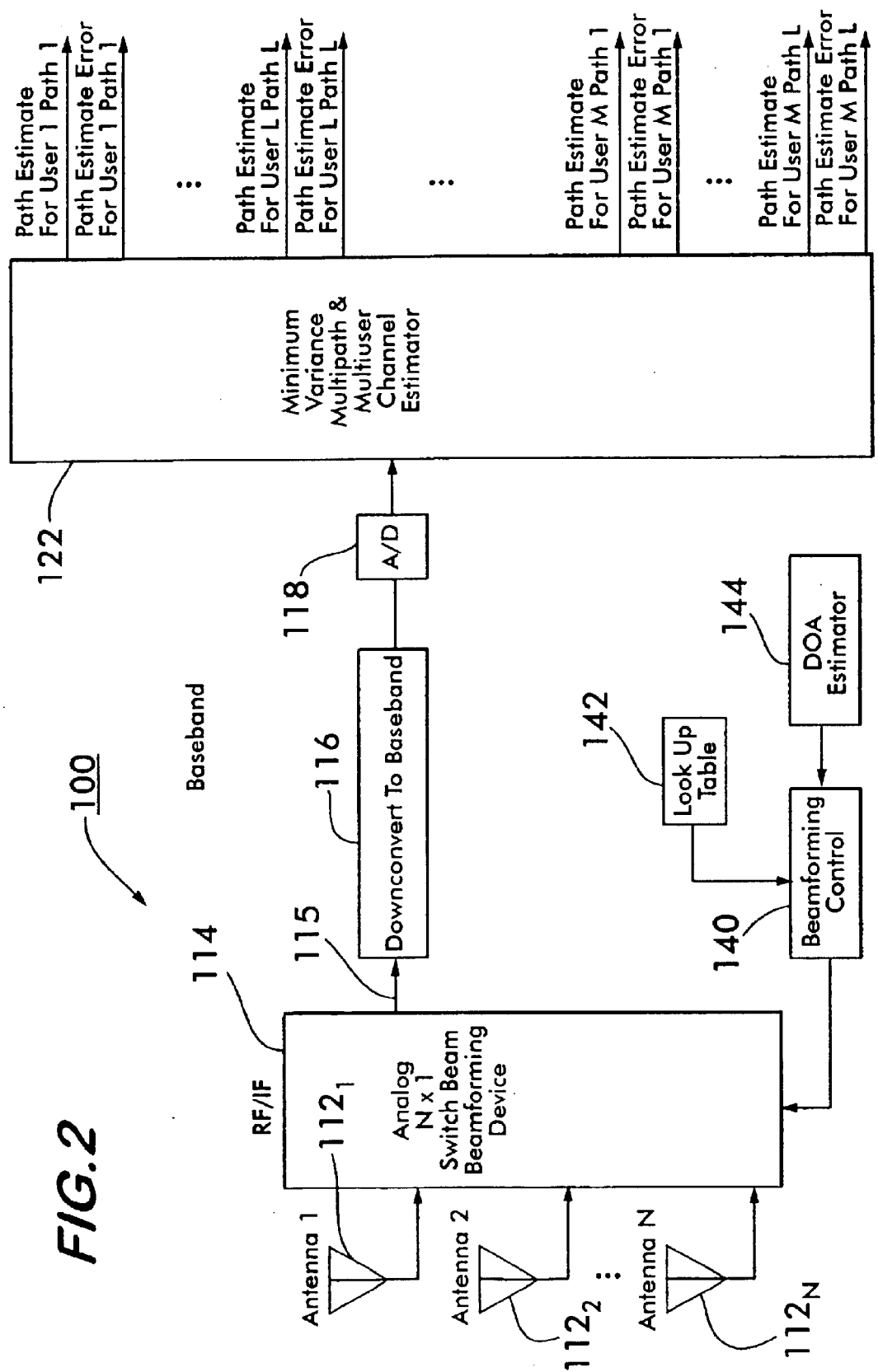
FIG. 2 is a block diagram of a switched beamforming device in accordance with the present invention.

FIG. 2 is a block diagram of the inventive switched beam antenna array receiver of the present invention. As shown, each of a plurality of antennas $112_1, 112_2, \ldots 112_N$ receives RF signals and outputs those signals on lines $113_1, 113_2, \ldots, 113_N$ to an analog N×1 switched beamforming circuit 114. In accordance with the present invention as described in detail above, circuit 114 is an N×1 beamforming circuit that generates a single beam at any given instant on line 115 in accordance with a schedule as controlled by a beamforming control circuit 140.

The particular beam output on line 113 is switched at a very high rate, such as chip rate. As just noted, however, the switching schedule can remain unchanged for a relatively long period, e.g., several milliseconds. Accordingly, in this exemplary embodiment, the beam schedule is calculated and updated offline at, for instance, the frame rate of the communications system, and is stored in a look up table in a memory 142. The control circuit 142 retrieves the beamforming schedule from the look up table to control circuit 114.

In accordance with the present invention, the beamforming control circuit also needs direction of arrival estimates of the various signals in the reception region (cell) to properly set the beam schedule. Accordingly, a direction of arrival estimator circuit 144 estimates the direction of arrival of the various user signals and provides those estimates to the beamforming control circuit 140. Direction of arrival estimators are well known in the prior art and therefore are not described in detail herein.

The single beam output from circuit 144 onto line 115 is frequency down converted by frequency downconverting circuit 116 and converted from analog-to-digital by an analog-to-digital converter 118. The digital beam signal is input to a minimum variance flat-fading multipath and multibeam channel estimator 122 to generate L path estimates and L path estimate errors for each of M simultaneous transmitters. Suitable minimum variance flat-fading multipath and multi-user channel estimator circuits and algorithms are well known in the prior art. The invention is not limited to use in flat fading channels. The inventive algorithm may be implemented by any form of digital processing apparatus. For exemplary purposes in connection with FIG. 2, the algorithm may be considered to be performed by a DSP in block 122.

V. Conclusion

In this specification, we considered the problem of optimally scheduling a multibeam antenna array for DS-CDMA communication systems operating in a multipath Rayleigh flat-fading channel. We derived a scheme that yields the minimum estimates of the received spread spectrum signals by computing optimal chip-rate beamforming scheduling (switching) sequences. More particularly, we formulated the received communication system as a linear, Gaussian, time-varying state-space model, the individual paths of the individual transmitted signals in the channel defining the "states" of the state-space model. We performed minimum mean square error estimation of the state of the state space model (i.e., the mean square estimation of individual paths of the individual signals in the received spread spectrum channel) to generate a beamforming schedule with optimal signal/interference-plus-noise ratio. This is a traditional use of Kalman filtering, namely, deriving the individual states from a signal containing a linear combination of states.

The advantages of our proposed scheme are: 1) only one beam is generated at each time instant (the generated antenna beam is used to estimate all spread spectrum users and their transmission paths); 2) the beam pattern of the antenna array is selected among a predetermined set of beam patterns; 3) the beam pattern changes at chip rate; 4) the switching sequence of the antenna beams is data independent when the direction of arrival (DOA) of the received spread spectrum signals are known (thus, the switching sequence is determined a priori); and 5) the optimal switched beam sequence is designed to yield minimum estimates of the communication channel

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. An apparatus for performing beamforming on a plurality of signals in a reception channel received from a receiving antenna array, said signals including simultaneous data signals from a plurality of transmitters, said circuit comprising:
    an N×1 switched beam beamforming circuit for weighting and combining outputs of N antenna receiving elements to generate a plurality of beam signals and selecting for output a single beam signal therefrom based on a beam scheduling sequence, wherein N is an integer greater than 1;
    a beam schedule generating circuit for generating said beam scheduling sequence used by said N×1 switched beam beamforming circuit for switching between ones of said plurality of beam signals for output;
    a frequency downconverting circuit for converting the selected single beam signal to a baseband signal; and
    a multi-path/multi-user estimation circuit for generating from said baseband signal path estimates and path estimate errors for each of said simultaneous data signals.

2. The apparatus of claim 1 further comprising an analog-to-digital converter between said frequency downconverting circuit and said multi-path/multi-user estimation circuit and wherein said multi-path/multi-user estimation circuit comprises a digital signal processor.

3. The apparatus of claim 2 wherein said beam schedule generating circuit is adapted to generate said beam scheduling sequence by determining a minimum mean square error estimation of a state-space model of said reception channel.

4. The apparatus of claim 3 wherein said beam schedule generating circuit switches said selected single beam signal at a rate faster than a data rate of said signals in said reception channel.

5. The apparatus of claim 3 wherein said apparatus is adapted to receive spread spectrum signals, said spread spectrum signals having a chip rate, and wherein said N×1 switched beam beamforming circuit switches said selected single beam at said chip rate.

6. The apparatus of claim 5 wherein said spread spectrum signals are code division multiple access signals.

7. The apparatus of claim 6 wherein said code division multiple access signals are direct sequence-code division multiple access signals.

8. The apparatus of claim 4 wherein said beam schedule generating circuit revises said beam scheduling sequence at predetermined intervals, said beam schedule generating circuit controlling said N×1 switched beam beamforming circuit in accordance with repetitions of a given beam scheduling sequence until revised.

9. The apparatus of claim 8 further comprising a memory and wherein said beam schedule generating circuit stores each beam scheduling sequence in said memory and retrieves said beam scheduling sequence from said memory to be used for controlling said N×1 switched beam beamforming circuit during a period said beam scheduling sequence is used.

10. A method for performing beamforming on a plurality of signals in a reception channel received from a receiving antenna array, said signals including simultaneous data signals from a plurality of transmitters, said method comprising the steps of:
    (1) weighting and combining outputs of N antenna receiving elements and generating a plurality of beam signals and selecting for output a single beam signal therefrom based on a beam scheduling sequence, wherein N is an integer greater than 1;
    (2) generating said beam scheduling sequence used in step (1) for switching between ones of said plurality of beam signals as the selected single beam signal;
    (3) converting said selected single beam signal to a baseband signal; and
    (4) generating path estimates and path estimate errors for each of said simultaneous data signals from said baseband beam signal.

11. The method of claim 10 further comprising the step of converting said selected single beam signal from analog to digital between steps (3) and (4).

12. The method of claim 11 wherein step (2) comprises generating said beam scheduling sequence by determining a minimum mean square error estimation of a state-space model of said reception channel.

13. The method of claim 12 wherein step (2) comprises switching between said plurality of beam signals at a rate faster than a data rate of said signals in said reception channel.

14. The method of claim 12 herein said signals in said reception channel are spread spectrum signals, said spread spectrum signals having a chip rate, and wherein step (2) comprises switching between said plurality of beam signals at said chip rate.

15. The method of claim 14 wherein said spread spectrum signals are code division multiple access signals.

16. The method of claim 15 wherein said code division multiple access signals are direct sequence-code division multiple access signals.

17. The method of claim 13 wherein step (2) comprises
    (2.1) revising said beam scheduling sequence at predetermined intervals; and (2.2) using each given beam scheduling sequence repetitively until said beam scheduling sequence is revised.

18. The method of claim 17 further comprising the steps of:

(5) storing each beam scheduling sequence in a memory; and (6) retrieving said beam scheduling sequence from said memory to be used for switching between ones of said plurality of beam signals for output during a period said beam scheduling sequence is used.

19. The apparatus of claim 5 wherein said beam schedule generating circuit generates said beam scheduling sequence by solving $$\hat{F}_{G-1} = \underset{F_{G-1}}{\mathrm{argmax}} Tr\{JP_{G-1|G-1}(F_{G-1})\};$$

and setting $$\hat{\hat{f}}_k = \hat{f}_k, \text{ for } k = 0, 1, \ldots, G-1$$

wherein k is a time index;

$\hat{f}_k$ is the time varying switch-beamforming vector based on a closed loop control function;

$\hat{\hat{f}}_k$ is the time varying switch-beamforming vector based on an open loop control function;

$$\hat{F}_{G-1} = (\hat{f}_0, \hat{f}_1, \ldots, \hat{f}_{G-1});$$

G is the processing gain;
J is a weighting matrix; and
$P_{G-1|G-1}F_{G-1\_}$ is the error covariance matrix.

20. The apparatus of claim 19 wherein $P_{G-1|G-1}(F_{G-1})$ is determined by running a Kalman filter.

21. The method of claim 14 wherein step (2) comprises generating said beam scheduling sequence by solving:

$$\hat{F}_{G-1} = \underset{F_{G-1}}{\mathrm{argmax}} Tr\{JP_{G-1|G-1}(F_{G-1})\};$$

and setting wherein $$\hat{f}_k = \hat{\hat{f}}_k, \text{ for } k = 0, 1, \ldots, G-1$$

k is a time index;

$\bar{f}_k$ is the time varying switch-beamforming vector based on a closed loop control function;

$\hat{\hat{f}}_k$ is the time varying switch-beamforming vector based on an open loop control function;

$$\hat{F}_{G-1} = (\hat{f}_0, \hat{f}_1, \ldots, \hat{f}_{G-1});$$

G is the processing gain;
J is a weighting matrix; and
$P_{G-1|G-1}F_{G-1\_}$ is the error covariance matrix.

22. The method of claim 21 wherein step (2) further comprises determining $P_{G-1|G-1}(F_{G-1})$ by running a Kalman filter.

* * * * *

UNITED STATES PATENT AND TRADEMARK OFFICE
CERTIFICATE OF CORRECTION

PATENT NO. : 6,968,022 B1
DATED : November 22, 2005
INVENTOR(S) : Poor et al.

It is certified that error appears in the above-identified patent and that said Letters Patent is hereby corrected as shown below:

<u>Column 1,</u>
Line 5, insert:
-- Statement Regarding Federally Sponsored Research This work was supported by a grant awarded by the Office of Naval Research (grant number N00014-00-1-0140) and a grant from the New Jersey Center for Wireless Telecommunications. The government may have certain rights in this invention. --.

Signed and Sealed this

Twenty-first Day of March, 2006

JON W. DUDAS
*Director of the United States Patent and Trademark Office*